United States Patent
Yang et al.

(10) Patent No.: US 12,502,872 B2
(45) Date of Patent: Dec. 23, 2025

(54) SYNTHETIC LEATHER

(71) Applicant: Dow Global Technologies LLC, Midland, MI (US)

(72) Inventors: Yunfeng Yang, Shanghai (CN); Xuejun Liu, Shanghai (CN); Lisa S. Madenjian, Lake Jackson, TX (US); Stacy L Pesek, Lake Jackson, TX (US); Jinliang Yan, Shanghai (CN); Jeffrey C. Munro, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 259 days.

(21) Appl. No.: 18/283,945

(22) PCT Filed: Apr. 9, 2021

(86) PCT No.: PCT/CN2021/086151
§ 371 (c)(1),
(2) Date: Sep. 25, 2023

(87) PCT Pub. No.: WO2022/213360
PCT Pub. Date: Oct. 13, 2022

(65) Prior Publication Data
US 2024/0173945 A1    May 30, 2024

(51) Int. Cl.
| | | |
|---|---|---|
| *B32B 27/06* | (2006.01) | |
| *B32B 5/02* | (2006.01) | |
| *B32B 5/18* | (2006.01) | |
| *B32B 5/24* | (2006.01) | |
| *B32B 27/32* | (2006.01) | |

(52) U.S. Cl.
CPC ............ *B32B 27/065* (2013.01); *B32B 5/02* (2013.01); *B32B 5/18* (2013.01); *B32B 5/245* (2013.01); *B32B 27/32* (2013.01); *B32B 2262/0253* (2013.01); *B32B 2262/0276* (2013.01); *B32B 2266/025* (2013.01); *B32B 2270/00* (2013.01); *B32B 2307/30* (2013.01); *B32B 2307/536* (2013.01); *B32B 2307/546* (2013.01); *B32B 2307/72* (2013.01)

(58) Field of Classification Search
CPC .... H01J 5/62; B32B 2255/10; B32B 2255/26; B32B 2255/28; B32B 2262/0223; B32B 2262/0238; B32B 2262/0246; B32B 2262/0253; B32B 2262/0261; B32B 2262/0276; B32B 2262/0284; B32B 2262/0292; B32B 2262/062; B32B 2262/065; B32B 2262/08; B32B 2262/144; B32B 2266/025; B32B 2270/00; B32B 2307/30; B32B 2307/536; B32B 2307/546; B32B 2307/72; B32B 27/065; B32B 27/32; B32B 5/02; B32B 5/022; B32B 5/18; B32B 5/245; B32B 7/022; D06N 2211/28; D06N 3/0004; D06N 3/0011; D06N 3/0047; D06N 3/045
See application file for complete search history.

(56) References Cited

U.S. PATENT DOCUMENTS

| | | | |
|---|---|---|---|
| 8,124,709 B2 | 2/2012 | Marchand et al. | |
| 11,230,641 B2 | 1/2022 | Degroot et al. | |
| 2011/0305886 A1 | 12/2011 | Phan et al. | |
| 2012/0108134 A1* | 5/2012 | Chee ..................... | D06N 3/045 442/370 |
| 2015/0038629 A1 | 2/2015 | Ultsch | |

FOREIGN PATENT DOCUMENTS

| | | |
|---|---|---|
| CN | 102497981 A | 6/2012 |
| CN | 112513170 A | 3/2021 |
| JP | 2000/063582 A | 2/2000 |
| JP | 2015/140500 A | 8/2015 |

* cited by examiner

*Primary Examiner* — Hai Vo
(74) *Attorney, Agent, or Firm* — Boyle Fredrickson S.C.

(57) ABSTRACT

The present disclosure provides an article. In an embodiment, the article includes (A) a top layer composed of a composition composed of (i) from 51 wt % to 90 wt % of a propylene-based polymer, and (ii) from 10 wt % to 49 wt % of an ethylene/octene multi-block copolymer having hard segments and soft segments. The ethylene/octene multi-block copolymer has a soft segment melt temperature (SS-Tm) less than 2° C. The article also includes (B) a bottom layer composed of a textile.

7 Claims, 2 Drawing Sheets

FIG. 1

Left  Right

FIG. 2

Left  Right

FIG. 3

SYNTHETIC LEATHER

BACKGROUND

The applications for synthetic leather continue to grow. Synthetic leather is used to produce clothing, footwear, bags and luggage, home upholstery, and automobile seats. Synthetic leather exhibits similar performance and handfeel when compared to natural leather. Synthetic leather provides the added advantage of being animal-friendly and is less expensive to produce compared to natural leather.

Conventional synthetic leathers have drawbacks. The production of polyurethane-based synthetic leather (PU-leather) requires the use of organic solvent, typically dimethyl formamide (DMF), in order to form the polyurethane synthetic leather matrix. DMF is hazardous to manufacturers, processors, consumers, and the environment.

Polyvinyl chloride synthetic leather (PVC-leather) requires halogenated polymer and plasticizer, typically phthalate-based plasticizer. Halogenated polymer and phthalate-based plasticizer each is hazardous to manufacturers, processors, consumers, and the environment.

Polyolefin elastomer based synthetic leather (POE-leather) is advantageous because it is halogen-free, it is phthalate-free, and the production of POE-leather does not require the use of harmful solvent, such as DMF. POE-leather has the added benefit of recyclability due to its thermoplastic nature. From the point of view of performance, POE has excellent weatherability and low temperature flexibility, and is resistant to hydrolysis and is resistant to yellowing. In addition, POE-leather finds favor in the drive for lightweighting that is presently occurring in the luggage/bag, shoe and automotive interior segments as POE-leather has a lower density compared to the density for each of PU-leather and PVC-leather.

Consequently, the art recognizes the need for POE-leather. The art further recognizes the need for POE-leather with bally flex resistance performance and softness that meets, or exceeds, the bally flex resistance performance and softness for PU-leather and/or PVC-synthetic leather.

SUMMARY

The present disclosure provides an article. In an embodiment, the article includes (A) a top layer composed of a composition composed of (i) from 51 wt % to 90 wt % of a propylene-based polymer, and (ii) from 10 wt % to 49 wt % of an ethylene/octene multi-block copolymer having hard segments and soft segments. The ethylene/octene multi-block copolymer has a soft segment melt temperature (SS-Tm) less than 2° C. The article also includes (B) a bottom layer composed of a textile.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably.

"Fabric" is a woven or non-woven (such as knitted) structure formed from individual fibers or yarn.

"Fiber" and like terms refer to an elongated column of entangled filaments. Fiber diameter can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of 15 or less. Microdenier (aka microfiber) generally refers to fiber having a diameter not greater than 100 micrometers.

"Filament" and like terms refer to a single, continuous strand of elongated material having generally round cross-section and a length to diameter ratio of greater than 10.

The term "foam," or "foam article," as used herein, is a structure constructed from a polymer; the structure comprises a plurality of discrete gas pockets, or foam cells, completely surrounded by polymer. The term "foam cell," or "cell," as used herein, is a discrete space within the foam composition. The foam cell is separated, or otherwise is defined, by membrane walls composed of the polymer of the foam composition An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

A "knitted fabric" is formed from intertwining yarn or fibers in a series of connected loops either by hand, with knitting needles, or on a machine. The fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

"Nonwoven" refers to a web or a fabric having a structure of individual fibers or threads which are randomly interlaid, but not in an identifiable manner as is the case of a knitted fabric.

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer or propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

"Styrene" has the Structure A below. A "styrenic-based polymer" is a polymer containing polymerized styrene as a monomer.

Structure A

"Woven" refers to a web or a fabric having a structure of individual fibers or threads which are interlaid in a pattern in an identifiable manner. A nonlimiting example of a woven fabric is a knitted fabric.

Test Methods

Bally flexibility test is performed in accordance with ASTM D6182 at 25° C. The bally flex test determines the durability of coatings applied to synthetic leather, leather and fabrics by repeatedly flexing the specimen. The Bally Flexometer conforms to DIN 53351, and operates at a rate of 100 cycles/minute. The ending cycle is determined by the cycle at which the plaque surface cracks and is reported as the bally flex result. Two specimens were tested for each sample and the average value was reported as the bally flex resistance value. Results are reported in the number of cycles. If no crack/damage is found after 100,000 cycles for the two specimens, the result is reported as "greater than 100,000 or ">100 k."

$^{13}$C NMR. $^{13}$C nuclear magnetic resonance ($^{13}$C NMR) Samples are prepared by adding approximately 2.7 g of a 50/50 (w:w) mixture of tetrachloroethane-d$_2$/orthodichlorobenzene containing 0.025 M chromium acetylacetonate, Cr(AcAc)$_3$, (or a tetrachloroethane-d$_2$ containing 0.025 M Cr(AcAc)$_3$) to 0.2 g polymer sample in a 10 mm NMR tube. Oxygen is removed from the sample by purging the tube headspace with nitrogen. The samples are then dissolved and homogenized by heating the tube and its contents to 135° C. using a heating block and a heat gun. Each dissolved sample is visually inspected to ensure homogeneity.

$^{13}$C NMR data are collected using a 10 mm cryoprobe on either a Bruker 400 MHz or a 600 MHz spectrometer. The data is acquired using a 7.3 second pulse repetition delay, 90-degree flip angles, and inverse gated decoupling with a sample temperature of 120° C. All measurements are made with no sample spinning and in locked mode. Samples are allowed to thermally equilibrate for 7 minutes prior to data acquisition. The $^{13}$C NMR chemical shifts are internally referenced to the EEE triad at 30.0 ppm.

Comonomer content is determined using the assignments from reference (Liu, W.; Rinaldi, P. L.; McIntosh, L. H.; and Quirk, R. P.; Macromolecules, 34, 2001, 4757-4767) and integrated $^{13}$C NMR spectrum to solve the vector equation s=fM, where M is an assignment matrix, s is a row vector representation of the spectrum, and f is a mole fraction composition vector. The elements of f is taken to be triads of ethylene (E) and octene (O) with all permutations of E and O. The assignment matrix M is created with one row for each triad in f and a column for each of the integrated NMR signals. The elements of the matrix are integral values determined by reference to the assignments (Liu, W.; Rinaldi, P. L.; McIntosh, L. H.; and Quirk, R. P.; Macromolecules, 34, 2001, 4757-4767). The equation is solved by variation of the elements as needed to minimize the error function between s and the integrated $^{13}$C data for each sample. This is performed in Microsoft Excel by using the Solver function.

The (i) mole percent (%) octene in an ethylene/octene multi-block copolymer ("octene mol %") and (ii) the mole % octene comonomer in the soft segment ("SS octene mol %") of an ethylene/octene multi-block copolymer of the present disclosure is determined by $^{13}$C NMR spectroscopy and the methods described in U.S. Pat. No. 7,608,668 in column 60 to column 63, which is incorporated herein by reference in its entirety.

Density is measured in accordance with ASTM D792, Method B. The result is recorded in grams per cubic centimeter (g/cc).

Differential Scanning Calorimetry (DSC)

Differential Scanning Calorimetry (DSC) Differential Scanning Calorimetry (DSC) can be used to measure the melting, crystallization, and glass transition behavior of a polymer over a wide range of temperature. For example, the TA Instruments Discovery DSC, equipped with an RCS (refrigerated cooling system) and an autosampler is used to perform this analysis. During testing, a nitrogen purge gas flow of 50 ml/min is used. Each sample is melt pressed into a thin film at about 190° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 5 minutes in order to remove its thermal history. Next, the sample is cooled to −90° C. at a 10° C./minute cooling rate and held isothermal at −90° C. for 5 minutes. The sample is then heated to 150° C. (this is the "second heat" ramp) at a 10° C./minute heating rate. The cooling and second heating curves are recorded.

The soft segment melting temperature, "SS-Tm," is determined from the DSC second heating curve. Ethylene/octene multi-block copolymer typically has two melting peaks, one melting peak associated with each of the soft segment and hard segment. The SS-Tm is associated with the lower temperature peak. For some block copolymers, the peak associated with the melting of the soft segments is a small hump (or bump) over the baseline, making it difficult to assign a peak maximum. This difficulty can be overcome by converting a normal DSC profile into a weighted DSC profile using the following method. In other cases, the soft segment is amorphous and has no measurable melting enthalpy or melting temperature. In DSC, the heat flow depends on the amount of the material melting at a certain temperature as well as on the temperature-dependent specific heat capacity. The temperature dependence of the specific heat capacity in the melting regime of linear low-density polyethylene leads to an increase in the heat of fusion with decreasing comonomer content. That is, the heat of fusion values get progressively lower as the crystallinity is reduced with increasing comonomer content. See Wild, L. Chang, S.; Shankernarayanan, M J. Improved method for compositional analysis of polyolefins by DSC. Polym. Prep 1990; 31: 270-1, which is incorporated by reference herein in its entirety. For a given point in the DSC curve (defined by its heat flow in watts per gram and temperature in degrees Celsius), by taking the ratio of the heat of fusion expected for a linear copolymer to the temperature-dependent heat of fusion (ΔH(T)), the DSC curve can be converted into a weight-dependent distribution curve. The second heating curve is baseline corrected by drawing a linear baseline between the heat flow at −30 and 135° C. The temperature-dependent heat of fusion curve can then be calculated from the summation of the integrated heat flow between two consecutive data points and then represented overall by the cumulative enthalpy curve. The expected relationship between the heat of fusion for linear ethylene/octene copolymers at a given temperature is shown by the heat of fusion versus melting temperature curve. Using random ethylene/octene copolymers, one can obtain the following relationship for the expected heat of fusion of linear copolymers, $\Delta H_{linear\ copolymer}$, and melting temperature, $T_m$ (in ° C.):

$$\Delta H_{linear\ copolymer}(J/g)=0.0072*T_m^2+0.3138*T_m+8.9767$$

For each integrated data point, at a given temperature, by taking a ratio of the enthalpy from the cumulative enthalpy curve to the expected heat of fusion for linear copolymers at that temperature, fractional weights can be assigned to each point of the DSC curve. The method is applicable to ethylene/octene copolymers but can be adapted to other polymers. The soft segment Tm is assigned as the location of the maximum in the enthalpy fractional weight versus temperature curve.

Flexural modulus is measured accordance with ASTM D790. 3 mm thick plaques were cut into small bars for the test. Three specimens are tested for each sample and the average value is reported as the flexural modulus value in MegaPascals (MPa).

Glass transition temperature, Tg, is determined from the DSC second heating curve where half the sample has gained the liquid heat capacity as described in Bernhard Wunderlich, The Basis of Thermal Analysis, in Thermal Characterization of Polymeric Materials 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Melting point, Tm, of the polymer is determined as the temperature corresponding to the maximum heat flow in the DSC heating curve.

Melt flow rate (MFR) in g/10 min (for propylene-based polymer) is measured in accordance with ASTM D 1238 (230° C./2.16 kg).

Melt index (MI) (I2) in g/10 min (for ethylene-based polymer) is measured in accordance with ASTM D1238 (190° C./2.16 kg).

Shore A hardness is measured in accordance with ASTM D2240. Two 3 mm thick plaques were stacked together for the test. For POE-leather compositions (Tables 2A, 2B), load 1 kg, duration time 5 seconds were used. For the ethylene/octene multi-block copolymers, duration time of 10 seconds was used (data in Table 1C).

DETAILED DESCRIPTION

The present disclosure provides an article. In an embodiment, the article includes (A) a top layer composed of a composition composed of (i) from 51 wt % to 90 wt % of a propylene-based polymer, and (ii) from 10 wt % to 49 wt % of an ethylene/octene multi-block copolymer having hard segments and soft segments, the ethylene/octene multi-block copolymer having a soft segment melt temperature (SS-Tm) less than 2° C. The article also includes (B) a bottom layer composed of a textile.

A. Top Layer (i) Propylene-Based Polymer

The top layer is composed of a composition that includes (i) from 51 wt % to 90 wt % of a propylene-based polymer and (ii) from 10 wt % to 49 wt % of an ethylene/octene multi-block copolymer having hard segments and soft segments, the ethylene/octene multi-block copolymer having a soft segment melt temperature (SS-Tm) less than 2° C. Weight percent is based on total weight of the top layer.

The propylene-based polymer consists of (i) polymerized units of propylene, (ii) polymerized units of $C_2$ comonomer or a $C_4$-$C_8$ α-olefin comonomer and (iii) optional additives. Nonlimiting examples of suitable comonomer include ethylene, butene, hexene, and octene.

In an embodiment, the propylene-based polymer is a propylene/ethylene copolymer resin having one, some, or all of the following properties:
- (i) a density from 0.85 g/cc to 0.87 g/cc; and/or
- (ii) a melt flow rate (MFR) from 5.0 g/10 min to 30 g/10 min, or from 8 g/10 min to 25 g/10 min; and/or
- (iii) a Shore A hardness value from 75 to 90, or from 80 to 89; and/or
- (iv) from 10 wt % to 15 wt % ethylene, based on total weight of the propylene/ethylene copolymer.

Nonlimiting examples of suitable propylene/ethylene copolymer include VERSIFY 3300 and VERSIFY 4301, available from Dow Inc.

(ii) Ethylene/Octene Multi-Block Copolymer

The top layer includes from 10 wt % to 49 wt % of an ethylene/octene multi-block copolymer. Weight percent is based on total weight of the top layer. The ethylene/octene multi-block copolymer has hard segments and soft segments. The ethylene/octene multi-block copolymer has a soft segment melt temperature (SS-Tm) less than 2° C.

The term "ethylene/octene multi-block copolymer" is a copolymer consisting of ethylene and octene comonomer in polymerized form (and optional additives), the polymer characterized by multiple blocks or segments of two polymerized monomer units (i.e., ethylene and octene) differing in chemical or physical properties, the blocks joined (or covalently bonded) in a linear manner, that is, a polymer comprising chemically differentiated units which are joined end-to-end with respect to polymerized ethylenic functionality. The ethylene/octene multi-block copolymer includes block copolymer with two blocks (di-block) and more than two blocks (multi-block). The ethylene/octene multi-block copolymer is void of, or otherwise excludes, styrene (i.e., is styrene-free), and/or vinyl aromatic monomer, and/or conjugated diene. When referring to amounts of "ethylene" or "octene," or "comonomer" in the copolymer, it is understood that this refers to polymerized units thereof. The ethylene/octene multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/octene multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Ethylene comprises the majority mole fraction of the whole ethylene/octene multi-block copolymer. Ethylene comprises at least 50 mole % (mol %) of the whole ethylene/octene multi-block copolymer. In an embodiment, the ethylene/octene multi-block copolymer contains from 50 mol %, or 60 mol %, or 65 mol % to 80 mol %, or 85 mol %, or 90 mol %, or 95 mol % ethylene and a reciprocal amount of octene, or from 5 mol %, or 10 mol %, or 15 mol %, or 20 mol % to 35 mol %, or 40 mol %, or less than 50 mol % octene based on the total moles of the ethylene/octene multi-block copolymer. In a further embodiment, the ethylene/octene multi-block copolymer contains from 5 mol % to 30 mol % octene (and 95 mol % to 70 mol % ethylene), or from greater than 16 mol % to 30 mol % octene, or from 17 mol % to 25 mol % octene (and from 83 mol % to 75 mol % ethylene).

The ethylene/octene multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of octene) is greater than 5 wt %, or greater than 8 wt %, or greater than 10 wt %, or greater than 15 wt %, based on the weight of the polymer. In an embodiment, the comonomer content in the soft segments is greater than 20 wt %, or greater than 25 wt %, or greater than 30 wt %, or greater than 35 wt %, or greater than 40 wt %, or greater than 45 wt %, or greater than 50 wt %, or greater than 60 wt % and can be up to 100 wt %.

The soft segments can be present in the ethylene/octene multi-block copolymer from 1 wt %, or 5 wt %, or 10 wt %, or 15 wt %, or 20 wt %, or 25 wt %, or 30 wt %, or 35 wt %, or 40 wt %, or 45 wt % to 55 wt %, or 60 wt %, or 65 wt %, or 70 wt %, or 75 wt %, or 80 wt %, or 85 wt %, or 90 wt %, or 95 wt %, or 99 wt % of the total weight of the ethylene/octene multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, the disclosure of which is incorporated by reference herein in its entirety. In particular, hard and soft segment weight percentages may be determined as described in column 57 to column 63 of U.S. Pat. No. 7,608,668, incorporated herein by reference.

The ethylene/octene multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. The blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/octene multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/octene multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/octene multi-block copolymer possesses Mw/Mn from 1.0 to 3.5, or from 1.3 to 3, or from 1.4 to 2.5, or from 1.4 to 2.

In addition, the ethylene/octene multi-block copolymer possesses a PDI (or Mw/Mn) fitting a Schultz-Flory distribution rather than a Poisson distribution. The present ethylene/octene multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp. 9234-9238.

In an embodiment, the present ethylene/octene multi-block copolymer possesses a most probable distribution of block lengths.

The present ethylene/octene multi-block copolymer used in the inventive compositions are a distinct subset of ethylene/octene multi-block copolymers. The present ethylene/octene multi-block copolymer exhibits increased soft segment octene incorporation when compared to the amount of octene present in the soft segment of other ethylene/octene multi-block copolymer. The present ethylene/octene multi-block copolymer's SS-Tm of less than 2° C. is the result of the increased soft segment octene incorporation present therein. The present ethylene/octene multi-block copolymers with high octene in the soft segment resulting in SS-Tm of less than 2° C., enable the balance of softness and Bally flex resistance required for the present inventive composition, as compared to ethylene/octene multi-block copolymers with lower octene in the soft segment, SS-Tm of greater than 2° C. The present ethylene/octene multi-block copolymer's SS-Tm of less than 2° C., or a SS-Tm from −30° C. to less than 2° C., or a soft segment that is amorphous (with no Tm) is hereafter interchangeably referred to as "soft-OBC."

In an embodiment, the ethylene/octene multi-block copolymer has hard segments and soft segments, consists only of ethylene monomer and octene comonomer (and optional additives) and the ethylene/octene multi-block copolymer (soft-OBC) has one, some, or all of the following properties:
(i) a SS-Tm less than 2° C., or a SS-Tm from −30° C. to less than 2° C., or an amorphous soft segment; and/or
(ii) from 21 mol % to 35 mol %, or from 22 mol % to 30 mol % octene in the soft segment and/or
(iii) from greater than 16 mol % to 25 mol % octene, and from 84 mol % to 75 mol % ethylene in the ethylene/octene multi-block copolymer; and/or
(iv) a Tg from −70° C. to −60° C., or from −70° C. to −66° C.; and/or
(v) a density from 0.855 g/cc to 0.880 g/cc; and/or
(vi) a Tm from 115° C. to 125° C.; and/or
(vii) a melt index (I2) from 0.1 g/10 min to 6.0 g/10 min; and/or
(viii) a Mw/Mn from 1.7 to 3.5; and/or
(ix) a polydisperse distribution of blocks and a polydisperse distribution of block sizes.

B. Bottom Textile Layer

The present article includes a bottom textile layer in addition to the top layer. A "textile" is a flexible material composed of a network of natural fibers, artificial fibers, and combinations thereof. Textile includes fabric and cloth. The textile may be woven, nonwoven, knitted, plained, or spunbond. Nonlimiting examples of natural fiber include cotton, wool, hemp, silk, and combinations thereof. Nonlimiting examples of artificial fiber include polyesters (PET), polyamides (nylon), acrylics, polyolefins, polyurethane (e.g., a spandex material), polyvinyl chlorides, polyvinylidene chlorides, polyvinyl alcohols, and combinations thereof.

In an embodiment, the textile is a nonwoven textile.

In an embodiment, the textile is a microfiber nonwoven textile. A "microfiber" textile is a fabric containing fiber having a diameter not greater than 100 micrometers.

In an embodiment, the textile has a density from 0.20 g/cc, or 0.25 g/cc to 0.27 g/cc, or 0.30 g/cc, or 0.31 g/cc, or 0.32 g/cc, or 0.35 g/cc, or 0.40 g/cc, or 0.50 g/cc.

In an embodiment, the textile contains fibers having a size from 0.1 denier, or 0.3 denier, or 1 denier, or 2 denier, or 3 denier to 4 denier, or 5 denier, or 6 denier, or 7 denier, or 8 denier, or 9 denier, or 10 denier. In another embodiment, the textile contains fibers having a size equal to or less than 10 denier.

In an embodiment, the textile has a thickness from 0.2 mm, 0.5 mm, or 1.0 mm to 1.5 mm, or 2.0 mm.

In an embodiment, the textile is a nonwoven textile having one, some, or all of the following properties:
(a) a density from 0.20 g/cc, or 0.25 g/cc to 0.32 g/cc, or 0.35 g/cc; and/or (b) a fiber size from 1 denier, or 3 denier to 5 denier; and/or
(c) a thickness from 0.2 mm, 0.5 mm, or 1.0 mm to 1.5 mm, or 2.0 mm.

In an embodiment, the textile is a fabric composed of polyester, polyethylene and/or polypropylene. The fabric is subjected to a pre-lamination treatment, e.g., corona surface treatment, impregnation, etc., and the top layer is heat laminated to the fabric such that the top layer directly contacts the bottom layer such that no intervening layers or no intervening structures are present between the top layer and the bottom layer.

The textile may comprise two or more embodiments disclosed herein.

In an embodiment, the article contains (A) a top layer and (B) a bottom layer containing a textile. The top layer directly contacts the bottom layer. The top layer (A) contains (i) from 51 wt % to 90 wt %, or from 55 wt % to 80 wt %, or from 55 wt % to 65 wt % of a propylene/ethylene copolymer. The propylene/ethylene copolymer has a density from 0.85 g/cc to 0.87 g/cc, and a melt flow rate from 5 g/10 min to 30 g/10 min, or from 8 g/10 min to 30 g/10 min. The top layer (A) also includes (ii) from 49 wt % to 10 wt %, or from 45 wt % to 20 wt %, or from 45 wt % to 35 wt % of a soft-OBC having a SS-Tm less than 2° C., or a SS-Tm from −30° C. to less than 2° C., or an amorphous soft segment. The soft-OBC includes from 21 mol % to 35 mol % octene, or from 22 mol % to 30 mol % octene in the soft segment. The top layer has a bally flex resistance value greater than 60,000, or from 65,000 to 150,000, or from 75,000 to 150,000, or from 80,000 to 150,000, or from 87,000 to 150,000, or from 90,000 to 140,000. The composition of the top layer has a Shore A hardness value less than 80, or from 55 to 75.

In an embodiment, the article contains (A) a top layer and (B) a bottom layer containing a textile. The top layer directly contacts the bottom layer. The top layer (A) contains (i) from 51 wt % to 90 wt %, or from 55 wt % to 80 wt %, or 55 wt % to 65 wt % of a propylene/ethylene copolymer. The propylene/ethylene copolymer has a density from 0.85 g/cc to 0.87 g/cc, and a melt flow rate from 5 g/10 min to 30 g/10 min, or from 8 g/10 min to 30 g/10 min. The top layer (A) also includes:

(a) a first soft-OBC having SS-Tm less than 2° C., or a SS-Tm from −30° C. to less than 2° C., or an amorphous soft segment; and (b) a second soft-OBC different than the first soft-OBC, the second soft-OBC having a SS-Tm less than 2° C., or a SS-Tm from −30° C. to less than 2° C., or an amorphous soft segment. The first soft-OBC and the second soft-OBC each includes from 21 mol % to 35 mol %, or from 22 mol % to 30 mol % octane on the soft segment. Components (a) and (b) combined are present in an amount from 49 wt % to 10 wt %, or from 45 wt % to 20 wt %, or from 45 wt % to 35 wt % of the top layer (A). Weight percent is based on total weight of the top layer (A). The top layer (A) has a bally flex resistance value greater than 60,000, or from 65,000 to 150,000, or from 75,000 to 150,000, or from 80,000 to 150,000, or from 87,000 to 150,000, or from 90,000 to 140,000. The composition of the top layer has a Shore A hardness value less than 80, or from 55 to 75.

C. Middle Foam Layer

In an embodiment, the article includes a middle foam layer (C) in addition to the top layer (A) and the bottom layer (B). The middle layer (C) is located between the top layer (A) and the bottom layer (B). The middle foam layer (C) directly contacts the top layer (A) and/or the bottom layer (B). In an embodiment, the middle foam layer (C) directly contacts the top layer (A) and directly contacts the bottom layer (B). The middle foam layer (C) is composed of a composition that includes (i) from 51 wt % to 90 wt % of a propylene-based polymer and (ii) from 10 wt % to 49 wt % of a soft-OBC having a SS-Tm less than 2° C. Weight percent is based on the total weight of the middle foam layer (C).

In an embodiment, the middle foam layer (C) is prepared by blending or compounding the individual components with one another in any conventional mixing apparatus, e.g., Banbury kneader or any suitable extruder, under conditions and for a time that produces a substantially homogeneous mixture, calendering the mixture using conventional equipment and conditions to form a sheet, and then heat laminating the sheet to the top layer and/or bottom textile layer using conventional lamination equipment and conditions. The middle foam layer is typically not subjected to foaming conditions until after it is laminated to the top layer (A) and the bottom textile layer (B). The foaming conditions are such that very fine and regular cells are formed throughout the layer. Typical foaming conditions include an oven temperature of 200° C. or more and an oven residence time of 60-120 seconds. The foam efficiency [i.e., the ratio of expanded volume to original (non-expanded) volume] is based on the thickness ratio, and it is typically from 1.5 to 5, or from 2 to 3.

In an embodiment, the article contains (A) a top layer and (B) a bottom layer containing a textile, and (C) a middle foam layer. The foam layer (C) is between the top layer (A) and the bottom textile layer (B). The top layer (A) directly contacts the middle foam layer (C) and the middle foam layer (C) directly contacts the bottom textile layer (B). The top layer (A) and the middle foam layer (C) each contain (i) from 51 wt % to 90 wt %, or from 55 wt % to 80 wt %, or from 55 wt % to 65 wt % of a propylene/ethylene copolymer. The propylene/ethylene copolymer in the top layer (A) and the propylene/ethylene copolymer in the middle foam layer (C) can be the same or can be different. The propylene/ethylene copolymer in the top layer (A) and the propylene/ethylene copolymer in the middle foam layer (C) each has a density from 0.85 g/cc to 0.87 g/cc, and a melt flow rate from 5 g/10 min to 30 g/10 min, or from 8 g/10 min to 30 g/10 min. The top layer (A) and the middle foam layer (C) each contain (ii) from 49 wt % to 10 wt %, or from 45 wt % to 20 wt %, or from 45 wt % to 35 wt % of a soft-OBC. The soft-OBC in layer (A) and the soft-OBC in the middle foam layer (C) can be the same or can be different. The soft-OBC in the top layer (A) and the soft-OBC in the middle foam layer (C) each has a SS-Tm less than 2° C., or a SS-Tm from −30° C. to less than 2° C., or an amorphous soft segment. The soft-OBC in the top layer (A) and the soft-OBC in the middle foam layer (C) each contain from 21 mol % to 35 mol %, or from 22 mol % to 30 mol % octene in the soft segment.

In an embodiment, the article contains (A) a top layer, (B) a bottom layer containing a textile, and (C) a middle foam layer. The foam layer (C) is between the top layer (A) and the bottom textile layer (B). The top layer (A) directly contacts the middle foam layer (C) and the middle foam layer (C) directly contacts the bottom layer. The top layer (A) and the middle foam layer (C) each contain (i) from 51 wt % to 90 wt %, or from 55 wt % to 80 wt %, or from 55 wt % to 65 wt % of a propylene/ethylene copolymer. The propylene/ethylene copolymer in the top layer (A) and the propylene/ethylene copolymer in the middle foam layer (C) can be the same or can be different. The propylene/ethylene copolymer in the top layer (A) and in the middle foam layer (C) each has a density from 0.85 g/cc to 0.87 g/cc, and a melt flow rate from 5 g/10 min to 30 g/10 min. The top layer (A) also includes (ii) from 10 wt % to 49 wt % of a soft-OBC having a SS-Tm less than 2° C., or a SS-Tm from −30° C. to less than 2° C. The middle foam layer (C) also includes:

(a) a first soft-OBC having a SS-Tm less than 2° C., or a SS-Tm from −30° C. to less than 2° C., or an amorphous soft segment; and (b) a second soft-OBC different than the first soft-OBC, the second soft-OBC having a SS-Tm less than 2° C., or a SS-Tm from −30° C. to less than 2° C., or an amorphous soft segment. The soft-OBC in the top layer (A), the first soft-OBC in the middle foam layer (C), the second soft-OBC in the middle foam layer (C) each contain from 21 mol % to 35 mol %, or from 22 mol % to 30 mol % octene in the soft segment. Components (a) and (b) combined are present in the middle foam layer (C) in an amount from 49 wt % to 10 wt %, or from 45 wt % to 20 wt %, or from 45 wt % to 35 wt % of the top layer. Weight percent is based on total weight of the middle foam layer (C).

D. Additives

The top layer and/or the middle foam layer may include one or more optional additives. Nonlimiting examples of suitable additives include antioxidants, curing agents, cross linking co-agents, boosters and retardants, processing aids, ultraviolet absorbers or stabilizers, antistatic agents, nucleating agents, slip agents, plasticizers, lubricants, viscosity control agents, tackifiers, anti-blocking agents, surfactants, extender oils, acid scavengers, pigments and/or dyes, and metal deactivators. When present the additive(s) is present in the amount from 0.01 wt % to less than 10 wt %, or from 0.1 wt % to less than 5 wt %, or from 0.1 wt % to less than 1.0 wt %, based on the total weight of each respective individual layer—the top layer and the middle foam layer.

In an embodiment, the two-layer article with top layer (A) and the bottom textile layer (B) and/or the three-layer article with top layer (A), bottom textile layer (B), and middle foam layer (C) further includes a primer layer and a top coating layer. The primer layer directly contacts the top layer and the top coating layer directly contacts the primer layer, such that the top coating layer is the outermost layer of the article. The primer layer is formed by applying a primer (e.g., chlorinated polypropylene (CPP)), to the top layer. A polyurethane, is subsequently applied to the primer layer. The bottom textile layer sustains the shaping of article (i.e. the synthetic leather), and provides mechanical properties for the article. The bottom textile layer also provides stability for the foaming of the middle foam layer (when present). The middle foam layer, when present, provides flexibility, cushioning, softness, thermal insulating, light weight and hand feel to the article's multilayer structure. The top layer provides protection against UV-radiation, heat and other weathering factors. The top layer may also carry visible functionalities such as print, embossment, color and/or gloss. The purpose of the top coating layer is to provide protection to the top layer and to protect the article from scratches, mars and abrasion; to provide a surface for text and designs; and to impart an aesthetically pleasing finish to the article. The purpose of the primer layer is to facilitate the attachment of the top coating layer to the top layer.

The present article finds many useful applications as a synthetic leather (i.e., a POE-leather). Hence, nonlimiting examples of the present article include clothing (shirt, blouse, slacks, skirt, dress, coat, jacket, shoes, boots, hat), purse, luggage, automobile interiors (automobile seat, interior door panels, dashboard), and furniture (chair, sofa).

By way of example, and not limitation, some embodiments of the present disclosure are described in detail in the following examples.

Examples

Materials used in the inventive examples and in the comparative samples are provided in Tables 1A-1C below.

TABLE 1A

| | | Materials | |
|---|---|---|---|
| Material | Product Name | Properties | Source |
| Propylene/ethylene copolymer | VERSIFY ™ 3300 | density 0.867 g/cm³, MFR 8 g/10 min (at 230° C./2.16 kg), Shore A = 85 | Dow |
| Propylene/ethylene copolymer | VERSIFY ™ 4301 | density 0.868 g/cm³, MFR 25 g/10 min (at 230° C./2.16 kg), Shore A = 84 | Dow |

TABLE 1B

| | | Materials | |
|---|---|---|---|
| Material | Product Name | Properties | Source |
| Ethylene/octene copolymer | ENGAGE ™ 8452 | density 0.875 g/cm³ MI 3 g/10 min Shore A = 74 | Dow |

TABLE 1B-continued

| | | Materials | |
|---|---|---|---|
| Material | Product Name | Properties | Source |
| Ethylene/octene copolymer | ENGAGE ™ 8100 | density 0.87 g/cm³ MI 1 g/10 min Shore A = 73 | Dow |
| Ethylene/octene copolymer | ENGAGE ™ 8407 | density 0.87 g/cm³ MI 30 g/10 min Shore A = 72 | Dow |
| Ethylene/octene copolymer | ENGAGE ™ 8200 | density 0.87 g/cm³ MI 5 g/10 min Shore A = 66 | Dow |
| Ethylene/octene copolymer | ENGAGE ™ 8150 | density 0.863 g/cm³ MI 0.5 g/10 min Shore A = 63 | Dow |
| Ethylene/octene copolymer | ENGAGE ™ 8842 | density 0.857 g/cm³ MI 1 g/10 min Shore A = 54 | Dow |
| Ethylene/octene copolymer | ENGAGE ™ 7467 | density 0.862 g/cm³ MI 1.2 g/10 min Shore A = 52 | Dow |
| Ethylene/octene copolymer | ENGAGE ™ HM7487 | density 0.860 g/cm³ MI <0.5 g/10 min Shore A = 58 | Dow |
| EPDM | NORDEL ™ 3640 | density 0.86 g/cm³ MU 40 ML1 + 4 at 125° C. Method ASTM D 1646 Shore A = 53 (cured) | Dow |
| Ethylene/octene copolymer | XUR 6044-3 | Density 0.859 g/cm³ MI 5 g/10 min Shore A = 45 | Dow |

TABLE 1C

Table 1C: Properties of ethylene/octene multi-block copolymers

| Material | Density, g/cc | I2 | Shore A | SS Tm, ° C. | Tg, ° C. | octene mol % | SS octene mol % |
|---|---|---|---|---|---|---|---|
| INFUSE 9000 | 0.875 | 0.5 | 74 | 9 | −61 | 12.2 | 18 |
| INFUSE 9007 | 0.867 | 0.5 | 65 | 8 | −61 | 14.8 | 17 |
| INFUSE 9010 | 0.877 | 0.5 | 80 | 28 | −56 | 10.7 | 13 |
| INFUSE 9100 | 0.879 | 1.0 | 71 | 3 | −60 | 12.8 | 19 |
| INFUSE 9107 | 0.868 | 1.0 | 57 | 9 | −61 | 14.8 | 18 |
| INFUSE 9500 | 0.878 | 5.0 | 69 | 4 | −65 | 12.8 | 18 |
| INFUSE 9507 | 0.865 | 5.0 | 59 | 7 | −62 | 15.2 | 19 |
| INFUSE 9530 | 0.887 | 5.0 | 83 | 6 | −63 | 10.4 | 18 |
| Soft-OBC1 | 0.877 | 0.5 | 57 | NA* | −67 | 17.2 | 28 |
| Soft-OBC2 | 0.860 | 5.3 | — | −16.2 | −66 | 22.5 | 26 |
| Soft-OBC3 | 0.869 | 0.4 | 57 | −26.3 | −67 | 19.2 | 29 |

*amorphous soft segment

Brabender Mixing and Compression Molding

POE resins were fed into a Brabender mixer at a set temperature of 180° C. with a rotor speed of 30 rpm. After two minutes, the rotor speed was increased to 50 rpm. The mixing was continued at 50 rpm for another six minutes. The compound was collected and pressed into a flat pie shape for the following use.

The compounds from Brabender mixing were compression molded into a plaque with a thickness of 1.1 mm. The compounds were preheated at 180° C. for 5 min and then degassed, followed by another 5 min pressing process at 180° C. The plaques were taken out from the mold after ramping down to room temperature. The obtained plaques were further cut into required shape and size for the tests.

Tables 2A-2B provide composition and performance of Inventive examples (IE) and Comparative samples (CS)

TABLE 2A

Compositions for Top Layer

| Ingredients | CS1 | CS2 | IE1 | IE2 | IE3 | IE4 | IE5 | IE6 | IE7 | CS3 | CS4 | CS5 |
|---|---|---|---|---|---|---|---|---|---|---|---|---|
| Versify 3300 | 100 | | 60 | 60 | 60 | 80 | 55 | 60 | | 60 | 60 | 60 |
| Versify 4301 | | 100 | | | | | | | 60 | | | |
| Soft-OBC1 | | | 40 | | 20 | 20 | 45 | | 40 | | | |
| Soft-OBC2 | | | | 40 | 20 | | | | | | | |
| Soft-OBC3 | | | | | | | | 40 | | | | |
| INFUSE 9007 | | | | | | | | | | 40 | | |
| INFUSE 9010 | | | | | | | | | | | 40 | |
| INFUSE 9000 | | | | | | | | | | | | 40 |
| INFUSE 9107 | | | | | | | | | | | | |
| INFUSE 9100 | | | | | | | | | | | | |
| INFUSE 9507 | | | | | | | | | | | | |
| Engage 8842 | | | | | | | | | | | | |
| Engage 8452 | | | | | | | | | | | | |
| Engage 8200 | | | | | | | | | | | | |
| XUR 6044-3 | | | | | | | | | | | | |
| Engage 8150 | | | | | | | | | | | | |
| ENGAGE 7467 | | | | | | | | | | | | |
| Engage HM7487 | | | | | | | | | | | | |
| Nordel 3640 | | | | | | | | | | | | |
| Bally flex cycles | >100k | >100k | >100k | 87k | 94k | >100k | 100k | >100k | >100k | 33k | 30k | 18k |
| Hardness, Shore A 1 kg load, 5 s | 84 | 86 | 72 | 68 | | | | | 73 | 75 | | |
| Flexural Modulus (Secant 2%) (MPa) | 32.9 | 31.3 | 16.3 | 12.7 | | | | | 16.2 | | | |

TABLE 2B

Compositions for Top Layer

| Ingredients | CS6 | CS7 | CS8 | CS9 | CS10 | CS11 | CS12 | CS13 | CS14 | CS15 | CS16 | CS17 | CS18 | CS19 |
|---|---|---|---|---|---|---|---|---|---|---|---|---|---|---|
| Versify 3300 | 60 | 60 | 60 | 60 | 60 | 60 | 60 | 60 | 60 | 60 | 60 | | | |
| Versify 4301 | | | | | | | | | | | | 50 | 40 | 60 |
| Soft-OBC1 | | | | | | | | | | | | 50 | 60 | 20 |
| Soft-OBC2 | | | | | | | | | | | | | | |
| Soft-OBC3 | | | | | | | | | | | | | | |
| INFUSE 9007 | | | | | | | | | | | | | | |
| INFUSE 9010 | | | | | | | | | | | | | | |
| INFUSE 9000 | | | | | | | | | | | | | | |
| INFUSE 9107 | 40 | | | | | | | | | | | | | |
| INFUSE 9100 | | 40 | | | | | | | | | | | | |
| INFUSE 9507 | | | 40 | | | | | | | | | | | |
| Engage 8842 | | | | 40 | | | | | | | | | | 20 |
| Engage 8452 | | | | | 40 | | | | | | | | | |
| Engage 8200 | | | | | | 40 | | | | | | | | |
| XUR 6044-3 | | | | | | | 40 | | | | | | | |
| Engage 8150 | | | | | | | | 40 | | | | | | |
| ENGAGE 7467 | | | | | | | | | 40 | | | | | |
| Engage HM7487 | | | | | | | | | | 40 | | | | |
| Nordel 3640 | | | | | | | | | | | 40 | | | |
| Bally flex cycles | 21K | 32K | 7K | 26K | 11K | 13K | 8K | 24K | 15K | 22K | 13K | 19K | 17K | 16K |
| Hardness, Shore A 1 kg load, 5 s | 75 | | | 72 | | | | | | 72 | | | | |

Tables 2A-2B provide the composition and properties for inventive examples 1-7 (IE1-IE7) and comparative samples 1-19 (CS1-CS19). Each inventive example includes a propylene/ethylene copolymer (Versify resin) and a soft-OBC. The comparative samples include neat propylene/ethylene copolymer (Versify resin), a blend of propylene/ethylene copolymer (Versify resin) and other ethylene/octene multi-block copolymer (INFUSE resin), ethylene/octene copolymer (ENGAGE resin), and one EPDM (NORDEL resin), and a blend of propylene/ethylene copolymer (Versify 4301 resin) and greater than or equal to 50 wt % soft-OBC.

Neat Versify 3300 resin (CS1) and neat Versify 4301 resin (CS2) each has acceptable bally flex resistance values (each resin having bally flex resistance value >100 k); however, neat Versify 3300 resin and neat Versify 4301 each has a Shore A hardness value greater than 80, which exceeds the upper limit of Shore A hardness value suitable for synthetic leather applications, making neat Versify 3300 and neat Versify 4301 unsuitable for synthetic leather applications.

In IE1-IE7, three different soft-OBCs were blended with Versify 3300 resin and Versify 4301 resin. The soft-OBC content in IE1-IE7 ranges from 20 wt % to 45 wt %, based on total weight of the composition. Tables 2A-2B show that the bally flex resistance values for IE1-IE7 are the same as, or similar to, the bally flex resistance values for neat Versify 3300 resin (CS1) and neat Versify 4301 resin (CS2). However, Tables 2A-2B show that IE1-IE7 exhibit improvement in softness (Shore A value less than 80, and flexural modulus less than 30 MPa) compared to Versify 3300 resin (CS1) and neat Versify 4301 resin (CS2). The improved softness of IE1-IE7 is attributed to the presence of the soft-OBC.

Figure 1:
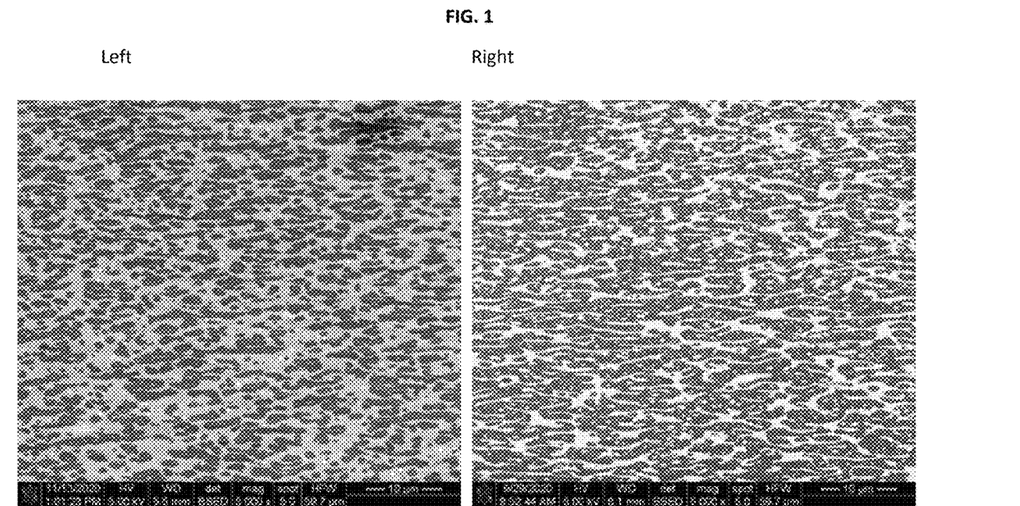
FIG. 1 shows a scanning electron micrograph (SEM) of inventive example 7 (IE7) left and a SEM of comparative sample 18 (CS18) (right).

In CS17 and CS18, the content of the soft-OBC1 (INFUSE 9077 resin) was increased to 50% and 60% respectively, which resulted in poor bally flex resistance values, i.e., bally flex resistance values less than 60,000 (CS17-19 k; CS18-17 k). When the soft-OBC is less than 50 wt %, the soft-OBC is the discontinuous phase and the propylene/ethylene copolymer is the continuous phase, such that the propylene/ethylene copolymer (Versify resin) is primarily responsible for resisting the bally flex. Bounded by no particular theory, it is believed that phase inversion occurs when the composition contains greater than or equal to 50 wt % soft-OBC, such that the soft-OBC becomes the continuous phase as shown in FIG. 1. FIG. 1 (left) shows SEM of IE7 (40 wt % soft-OBC1), and FIG. 1 (right) shows CE18 (60 wt % soft-OBC1), each composition containing a compliment amount of Versify 4301 (bright areas) resin to 100 wt %. When the soft-OBC is the continuous phase (dark areas) (CS18, FIG. 1 right), the bally flex resistance value drops (CS18 bally flex resistance value 17,000) because the continuous phase soft-OBC is more susceptible to flex cracking than is the propylene/ethylene copolymer (Versify resin).

Table 2B shows other ethylene/octene multi-block copolymer (INFUSE resins) and ethylene/octene copolymer (ENGAGE resins) blended with propylene/ethylene copolymer (Versify 3300 resin), see CS3-CS16. Each of CS3-CS16 exhibits unacceptably low bally flex resistance values, i.e., bally flex resistance values less than 60,000.

Figure 2:
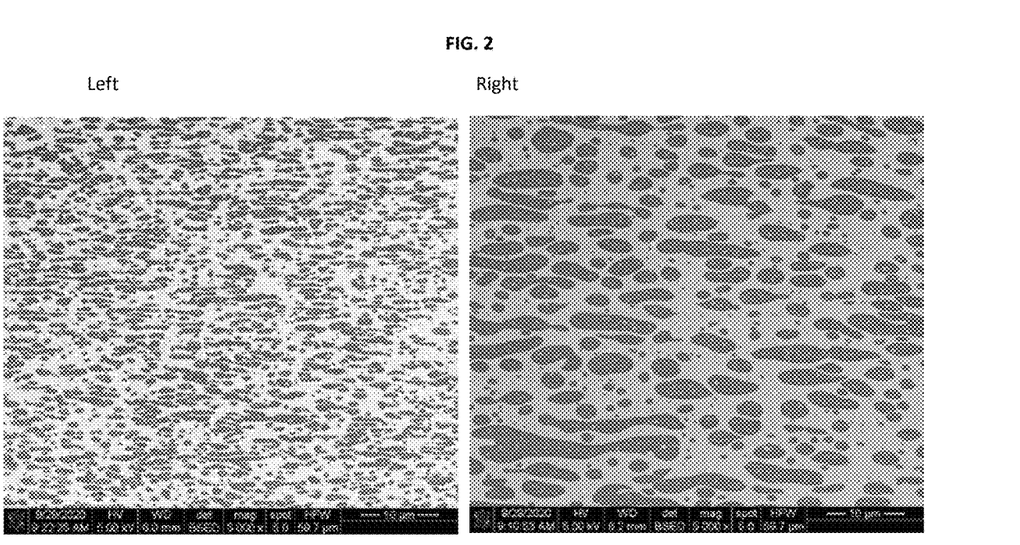
FIG. 2 shows a SEM of IE1 (left) and CE6 (right).
Figure 3:
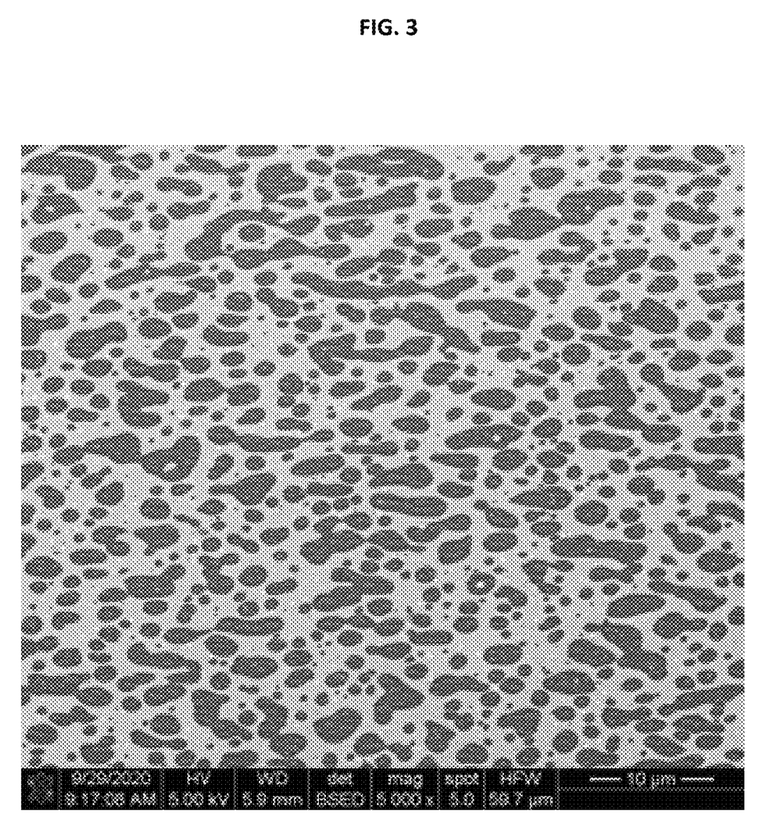
FIG. 3 shows a SEM of CS9.

Bounded by no particular theory, it is believed that soft-OBC results in a smaller domain size compared to the domain size of other ethylene/octene multi-block copolymer at the same loading in propylene/ethylene copolymer. FIG. 2 shows soft-OBC (IE1 with 40 wt % soft-OBC1) with smaller domain size compared to the domain size of other ethylene/octene multi-block copolymer (CS6 with 40 wt % INFUSE 9107 resin).

In summary, it was unexpectedly found that the blends of propylene/ethylene copolymer (Versify resin) with 10-49 wt % of soft-OBC provide a composition with bally flex resistance value greater than 60,000 and a Shore A hardness value less than 80. Conversely, blends with propylene/ethylene copolymer (Versify resin) and other ethylene/octene multi-block copolymer (INFUSE resin) or ethylene/octene copolymer (ENGAGE resin) resulted in deterioration of the bally flex resistance value (less than 60,000).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. An article comprising:
    A. a top layer composed of a composition comprising
        (i) from 51 wt % to 90 wt % of a propylene-based polymer, and
        (ii) from 10 wt % to 49 wt % of an ethylene/octene multi-block copolymer having hard segments and soft segments, the ethylene/octene multi-block copolymer having a soft segment melt temperature (SS-Tm) less than 2° C., wherein the ethylene/octene multi-block copolymer comprises from 21 mol % to 35 mol % of octene in the soft segment; and
    B. a bottom layer comprising a textile.

2. The article of claim 1 wherein the composition of the top layer has
    (i) a bally flex resistance value greater than 60,000; and
    (ii) a Shore A hardness less than 80.

3. The article of claim 1 wherein the propylene-based polymer is a propylene/ethylene copolymer having
    a density from 0.85 g/cc to 0.87 g/cc; and
    a melt flow rate from 5 g/10 min to 30 g/10 min.

4. The article of claim 1 wherein the composition of the top layer comprises
    from 10 wt % to 49 wt % of
        a first ethylene/octene multi-block copolymer having hard segments and soft segments, the first ethylene/octene multi-block copolymer having a soft segment melt temperature (SS-Tm) less than 2° C., wherein the first ethylene/octene multi-block copolymer comprises from 21 mol % to 35 mol % of octene in the soft segment; and
        a second ethylene/octene multi-block copolymer different than the first ethylene/octene multi-block copolymer, the second ethylene/octene multi-block copolymer having hard segments and soft segments, the second ethylene/octene multi-block copolymer having a soft segment melt temperature (SS-Tm) less than 2° C., wherein the second ethylene/octene multi-block copolymer comprises from 21 mol % to 35 mol % of octene in the soft segment.

5. The article of claim 1 comprising
    C. a middle foam layer composed of a composition comprising
        (i) from 51 wt % to 90 wt % of a propylene-based polymer, and
        (ii) from 10 wt % to 49 wt % of an ethylene/octene multi-block copolymer having hard segments and soft segments, the ethylene/octene multi-block copolymer having a soft segment melt temperature (SS-Tm) less than 2° C., wherein the ethylene/octene multi-block copolymer in the middle foam layer comprises from 21 mol % to 35 mol % of octene in the soft segment.

6. The article of claim 5 wherein the propylene-based polymer in the middle foam layer is a propylene/ethylene copolymer having
    a density from 0.85 g/cc to 0.87 g/cc; and
    a melt flow rate from 5 g/10 min to 30 g/10 min.

7. The article of claim 5 wherein the composition of the middle foam layer (C) comprises
    (ii) from 10 wt % to 49 wt % of
        a first ethylene/octene multi-block copolymer having hard segments and soft segments, the first ethylene/octene multi-block copolymer having a soft segment melt temperature (SS-Tm) less than 2° C., wherein the first ethylene/octene multi-block copolymer in the middle foam layer comprises from 21 mol % to 35 mol % of octene in the soft segment; and
        a second ethylene/octene multi-block copolymer different than the first ethylene/octene multi-block copolymer, the second ethylene/octene multi-block copolymer having hard segments and soft segments, the second ethylene/octene multi-block copolymer having a soft segment melt temperature (SS-Tm) less than 2° C., wherein the second ethylene/octene multi-block copolymer in the middle foam layer comprises from 21 mol % to 35 mol % of octene in the soft segment.

* * * * *